United States Patent [19]

Ishikawa et al.

[11] Patent Number: 5,004,207
[45] Date of Patent: Apr. 2, 1991

[54] SHOCK MOUNTING STRUCTURE AND MAGNETIC DISK APPARATUS

[75] Inventors: Jun Ishikawa, Fujisawa; Kazuhiko Takada, Yamato, both of Japan

[73] Assignee: International Business Machines Corporation, Armonk, N.Y.

[21] Appl. No.: 427,151

[22] Filed: Oct. 25, 1989

[30] Foreign Application Priority Data

Nov. 11, 1988 [JP] Japan ............... 63-283759

[51] Int. Cl.⁵ .............................................. F16M 13/00
[52] U.S. Cl. ................................... 248/632; 248/638; 360/97.02; 267/141
[58] Field of Search ............... 248/615, 632, 633, 634, 248/635, 638, 673, 677, 188.1, 188.8, 345.1; 206/444; 360/97.02; 267/141, 153

[56] References Cited

U.S. PATENT DOCUMENTS

| | | | |
|---|---|---|---|
| 1,876,640 | 9/1932 | Dobson | 248/635 |
| 2,520,757 | 8/1950 | Cain | 248/632 |
| 3,425,652 | 2/1969 | Leary | 248/632 |
| 4,442,367 | 4/1984 | Suzuki | 248/632 |
| 4,693,457 | 9/1987 | Kamata | 267/141 |

FOREIGN PATENT DOCUMENTS 137788 6/1987 Japan ............... 360/97.02

Primary Examiner—Ramon O. Ramirez
Assistant Examiner—Robert A. Olson
Attorney, Agent, or Firm—Robert W. Lahtinen; Richard E. Billion

[57] ABSTRACT

A device that is to be isolated from mechanical shock and vibration such as a magnetic disk storage device is provided with a series of four shock mounting members that have a bolt projecting from one axial end and a stiffened grooved portion at the opposite axial end. A frame member with a rigid end portion and cantilevered, resilient frame members extending therefrom carries a series of U-shaped hook portions that are aligned with the shock mounting members. The pair of hooks on the end portion face the same direction and extend in the opposite direction with respect to the cantilevered frame portions. The other pair of hooks are mounted on the resilient cantilevered frame portions and face toward or away from one another so that they may be placed in engagement with the cooperating shock mounting member grooves by forcing the cantilevered frame portions toward or away from one another and thereafter releasing such parts when the hooks are aligned with the respective grooves. Thereafter accidental disengagement of the hooks is prevented by disabling the cantilevered frame portions by attachment of the frame to another rigid member of the assembly such as a circuit card.

5 Claims, 7 Drawing Sheets

SHOCK MOUNTING STRUCTURE AND MAGNETIC DISK APPARATUS

FIELD OF THE INVENTION

This invention relates to shock mounting structures to protect and isolate an apparatus from external vibration and impact, especially to a shock mounting structure for a disk storage apparatus in which at least one disk and a transducer head positioning system are mounted on a base.

BACKGROUND OF THE INVENTION

Shock mounting structures of the prior art which buffer vibration and impact externally applied to a magnetic disk apparatus in which a magnetic disk driving motor is mounted on a base typically have constructions as shown in FIGS. 11, 12, or 13.

FIG. 11 shows a shock mount structure in which a frame 75 is retained by securing a cylindrical shock mount element 72 by a screw 73 protruding from one end thereof to a base 71 on which a magnetic disk and a spindle motor are mounted.

Shock mount 72 has a screw 73 at one axial end that is received in a threaded opening in base 71 and a screw 74 at the other axial end that extends through aperture 76 in frame 75 is secured by a nut 77.

FIG. 12 shows a shock mount structure in which a frame 85 is secured using a shock mounting part 81B with a threaded opening 81A at the bottom of a base 81 on which a magnetic disk driving motor is mounted. The screw 83 protruding from one end of a cylindrical shock mount element 82 is received in the threaded opening 81A of the shock mounting part 81B, to mount the cylindrical shock mount element 82 on the base 81. A bolt 87 extends through a mounting hole 86 in frame 85 and is received in the internally threaded opening 82A of the cylindrical shock mount element 82 to retain the frame.

FIG. 13 shows a shock mount structure in which a frame 95 is secured by forming a cutout 91A at the end of a base 91 on which a magnetic disk driving motor is mounted. Threaded opening 91B is formed in the base extending from the surface of cutout 91A. A bolt 97 is inserted through a through-hole of a bushing-type shock mount element 92 and a mounting hole 96 in frame 95 and received in the threaded opening 91B.

For the shock mounting structure shown in FIG. 11, the manufacturing cost is increased because the nut is used, and a space corresponding to the height of the fastened nut (L) cannot be used for the elastomeric shock mount portion as shown in FIG. 14. Although the space occupied or rendered otherwise unusable by the fastening nut may appear trivial, space within a standard form factor or available within a device becomes a critical consideration in a high density disk storage environment where every effort is made to maximize the storage capacity of the device.

In the shock mounting structure shown in FIG. 12, the diameter of the cylindrical shock mount element 82 cannot provide sufficient shock absorbing capability because the cylindrical member 82 is horizontally arranged. Also, only a small cushion effect can be obtained for the volume of the shock absorbing member 82 because the metal internal thread 82A is mounted in the member 82.

The shock absorbing capability of the structure shown in FIG. 13 is limited because the frame 95 is fixed at the side of the base 91.

SUMMARY OF THE INVENTION

The present invention solves the above problems. It is an object of this invention to provide a shock mounting structure which does not require any nut when fixing a frame used to mount a vibration-proof object such as a base of a magnetic disk apparatus on an external apparatus such as a personal computer. It is a further object of the invention to provide a shock mounting device which can be easily manufactured, has few limitations with respect to the location in the apparatus at which it may be placed, and which has an adequate cushion effect to diminish or isolate external vibration and impact.

In accordance with this invention, a shock absorbing member, at least a part of which consists of an elastic material, preferably a material having both elasticity and viscosity such as rubber with vibration damping function, and which has a groove at the side, is secured to the vibration-isolated object which is to be isolated such as the base on which at least one of a magnetic disk driving motor and a magnetic head positioning system is mounted. A frame to mount the vibration-isolated object on an external apparatus is formed with one end of the frame fixed and the other end of the frame free and with an elastic frame part included. A hook is provided on the frame part so that the hook can be fitted into the groove of the shock absorbing member. A rigidifying member such as a circuit board is mounted on the frame to dimensionally fix the frame to the shock absorbing member with the hook fitted into the groove of the shock absorbing member.

In order to fit the hook into the groove of the shock absorbing member, it is only necessary to bend the frame part to separate the free end from the shock absorbing member before releasing it.

In the preferred embodiment of this invention, two shock absorbing members, as described above, are separately fixed to the vibration-isolated object, two frame parts as described above are formed on the frame so that two free ends of the frame parts are separated by a distance equal to that between the two shock absorbing members, a hook is provided on each of the two frame parts, and a fixing member is mounted on the two frame parts to fix the frame to the shock absorbing member with these hooks being fitted into the grooves of the corresponding shock absorbing members respectively.

It is preferable that groove engaging faces of the two hooks provided on the two frame parts respectively, each of which may engage with the bottom of the groove of the corresponding shock absorbing member, are oriented oppositely. When the groove engaging faces of the two hooks are oriented inward toward each other, it is only necessary to bend the two frame parts so that their free ends will be brought to the outside of the corresponding shock absorbing members respectively before releasing the frame parts, in order that the two hooks can be fitted into the groove of the corresponding shock absorbing members respectively.

When the groove engaging faces of the two hooks are oriented outwardly, facing away from one another, it is only necessary to bend the two frame parts so that their free ends will be brought to the inside of the corresponding shock absorbing members respectively before releasing the frame parts, in order that the two hooks can be fitted into the groove of the corresponding shock absorbing members respectively.

DETAILED DESCRIPTION

Figure 1:
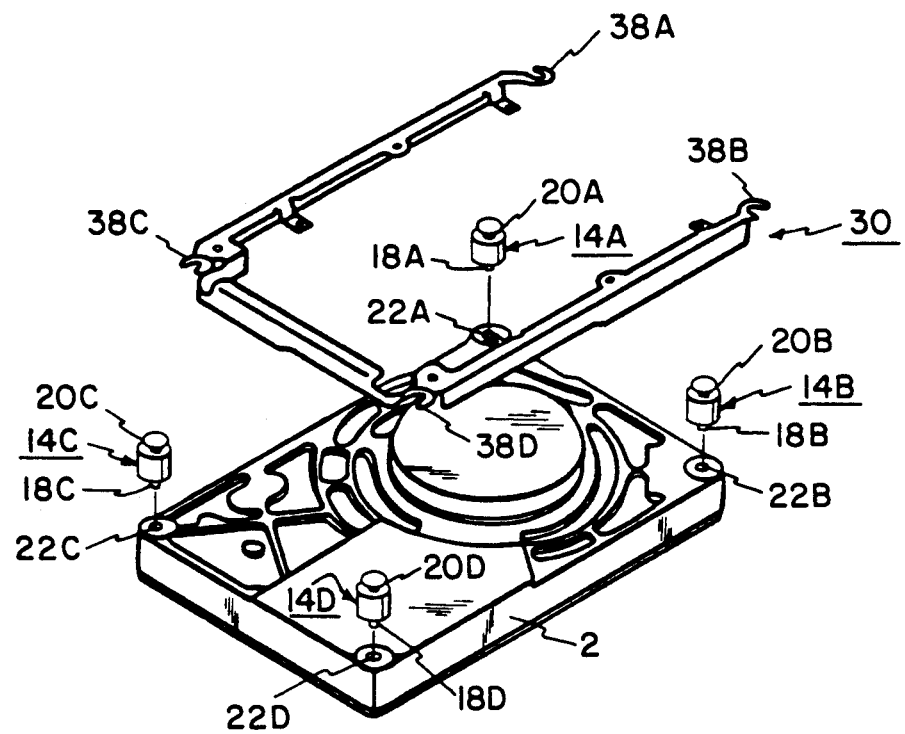
FIG. 1 is an exploded perspective view showing an embodiment of a magnetic disk apparatus of this invention viewed from the back or bottom.

FIG. 1 is an exploded perspective view of an embodiment in which this invention is applied to a hard disk drive, which shows the hard disk drive viewed from the back.

Figure 2:
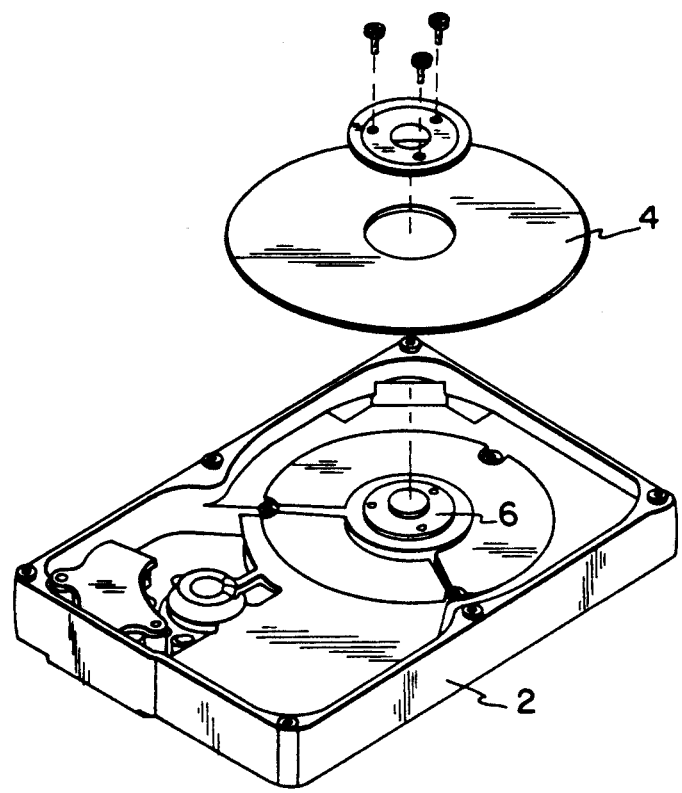
FIG. 2 is an exploded perspective view showing the embodiment of FIG. 1, with no magnetic disk mounted, viewed from the front or top.
Figure 3:
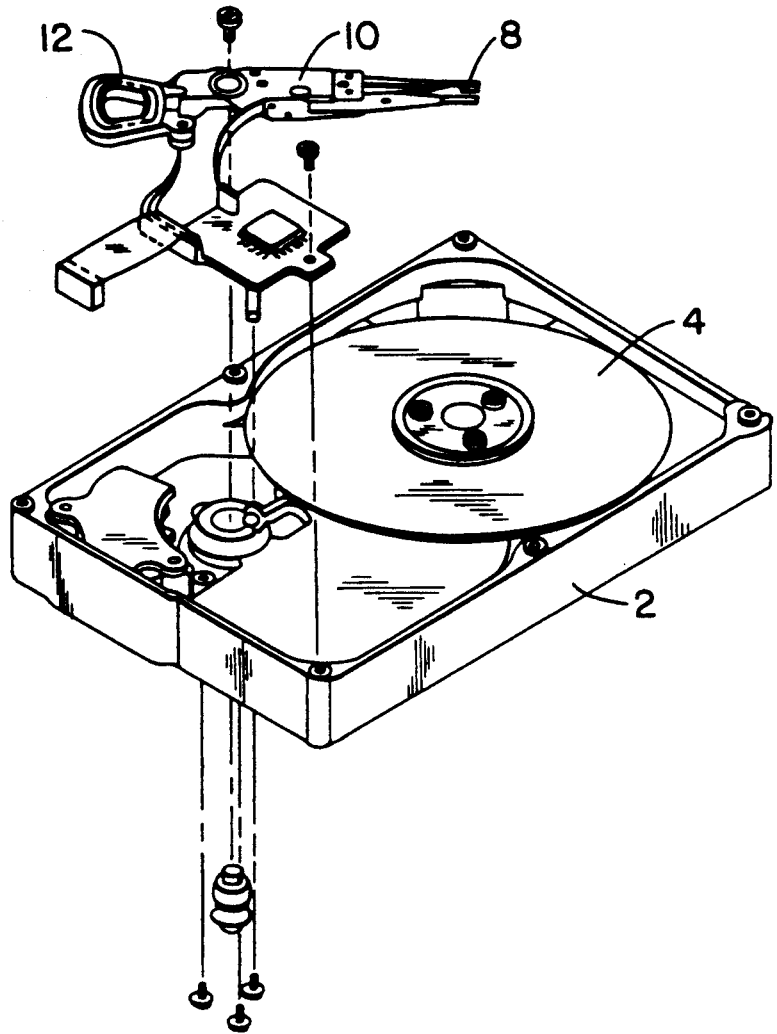
FIG. 3 is an exploded perspective view showing the embodiment of FIG. 1, with the magnetic disk mounted but no magnetic head positioning system mounted, viewed from the front or top.

FIGS. 2 and 3 are exploded views of the hard disk drive of FIG. 1 viewed from the front. With reference to these figures, a spindle motor 6 to drive a magnetic disk 4, an arm 10 to support a magnetic head 8, and an arm driving motor 12, for example, consisting of a voice coil motor for positioning of the magnetic head 8, which are main functional parts of the hard disk drive, are fixed on the back of a base 2 by bolts etc.

Figure 4:
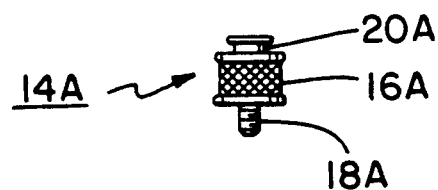
FIG. 4 is a side elevation showing an example of a shock absorbing member used for the embodiment in FIG. 1.

The shock absorbing members, such as vibration-isolating mounts 14A, 14B, 14C, and 14D to protect the base 2 from external vibration and impact; are mounted at four corners on the back of the base 2 respectively. The shock absorbing members 14A, 14B, 14C, and 14D have the same structure. FIG. 4 shows an example of construction of the shock absorbing assembly 14A.

As shown in FIG. 4, the vibration-isolating mount 14A comprises a cylindrical rubber element 16A. A metal screw 18A is welded on one end of the cylindrical rubber element 16A and a metal fitting with a ring groove 20A is welded on the other end of the rubber element. Threaded openings 22A, 22B, 22C, and 22D are formed at the four corners of the base 2 respectively. The shock absorbing members 14A, 14B, 14C, and 14D can be fixed to the base 2 by screwing the metal screws 18A, 18B, 18C, and 18D into the threaded openings 22A, 22B, 22C, and 22D, respectively.

Figure 5:
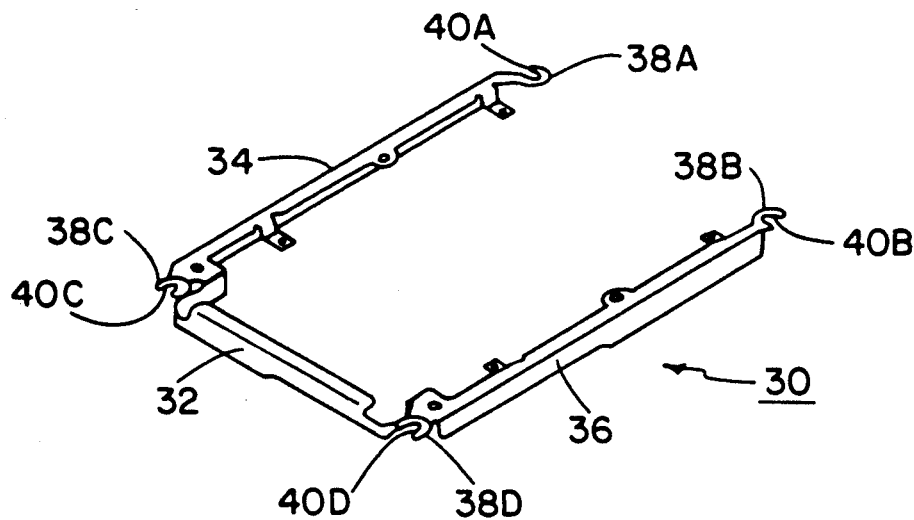
FIG. 5 is a perspective view showing an example of a frame used for the embodiment in FIG. 1.

A frame 30 is used to fix the base 2 to an external apparatus such as a personal computer, and is formed into the shape of the letter "U" by bending a plate, for example consisting of a rolled steel plate. The frame 30, as shown in FIG. 5, has a basic frame part 32 with the length equal to the distance between the shock absorbing members 14A and 14B, a first cantilevered frame part 34 which extends from one end of the basic frame part 32 and which has the free end on the opposite side of the basic frame part 32, and a second frame part 36 which is cantilevered from the other end of the basic frame part 32 in parallel to the first frame part 34 which has the free end on the opposite side of the basic frame part 32. The basic frame part 32, the first frame part 34, and the second frame part 36 are elastic because the whole of the frame 30 is made of a rolled plate.

A U-shaped hook 38A is provided on the free end of the first frame part 34 so that the hook 38A can be fitted into the groove 20A of the shock absorbing member 14A to temporarily fix the frame 30 to the shock absorbing member 14A. A U-shaped hook 38B is provided on the free end of the second frame part 36 so that the hook 38B can be fitted into the groove 20B of the shock absorbing member 14B to temporarily fix the frame 30 to the shock absorbing member 14B. A U-shaped hook 38C is provided on one end of the basic frame part 32, that is, a connection point between the first frame part 34 and the basic frame part 32, in other words, a fixed end of the first frame part 34 so that the hook 38C can be fitted into the groove 20C of the shock absorbing member 14C to temporarily fix the frame 30 to the shock absorbing member 14C. A U-shaped hook 38D is provided on the other end of the basic frame part 32, that is a connection point between the second frame part 36 and the basic frame part 32, in other words, a fixed end of the second frame part 36 so that the hook 38D can be fitted into the groove 20D of the shock absorbing member 14D to temporarily fix the frame 30 to the shock absorbing member 14D.

A groove engaging face 40A of the hook 38A which may engage with the bottom of the groove 20A of the shock absorbing member 14A and a groove engaging face 40B of the hook 38B which may engage with the bottom of the groove 20B of the shock absorbing member 14B are oriented outward so that they are oriented oppositely. The groove engaging face 40C of the hook 38C which may engage with the bottom of the groove 20C of the shock absorbing member 14C and the groove engaging face 40D of the hook 38D which may engage with the bottom of the groove 20D of the shock absorbing member 14D are oriented outward so that they are oriented in the same direction.

Figure 6:
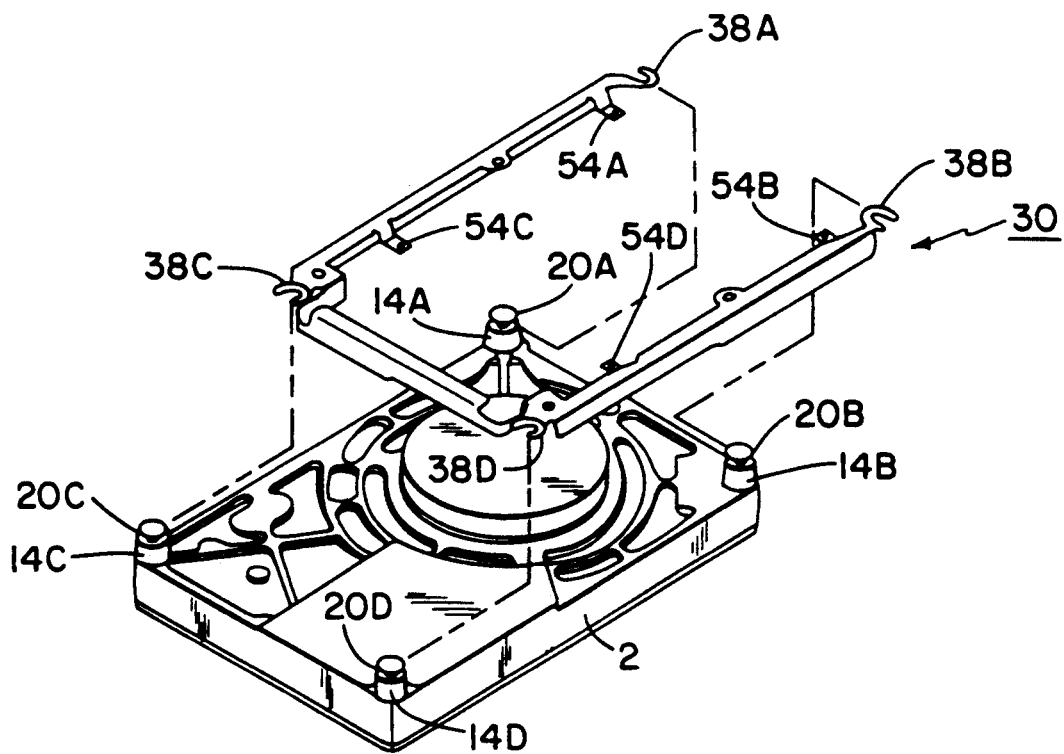
FIG. 6 is a perspective view showing the condition in which hooks of the frame are adapted to be fitted into grooves of the shock absorbing member.

To temporarily secure the frame 30 to the vibration-isolating mounts 14A, 14B, 14C, and 14D, first, the free ends of the first frame section 34 and the second frame part 36 are bent so that the hooks 38A and 38B will be brought to the inside of the shock absorbing members 14A and 14B respectively and the hooks 38C and 38D can be fitted into the grooves 20C and 20D of the shock absorbing members 14C and 14D respectively, as shown in FIG. 6. Then the free ends of the first frame part 34 and the second frame are released part 36, so that the hooks 38A and 38B are fitted into the grooves 20A and 20B of the shock absorbing members 14A and 14B respectively due to the elasticity of the first and second frame part. This completes the temporary fixing of the frame 30 to the shock absorbing members 14A, 14B, 14C, and 14D.

Figure 7:
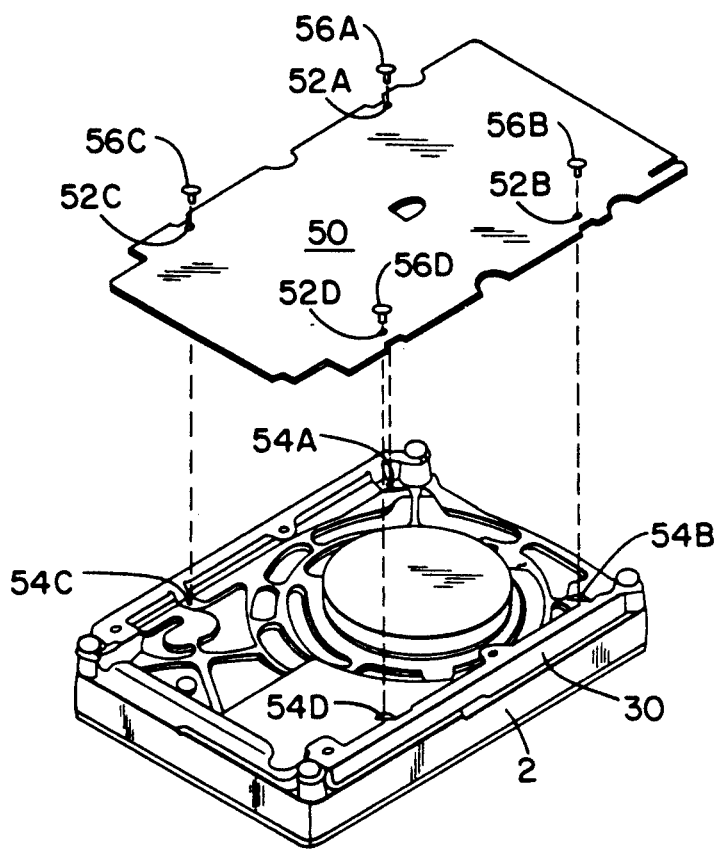
FIG. 7 is a perspective view illustrating the mounting of a circuit board on the frame after the hooks are fitted into the grooves.
Figure 8:
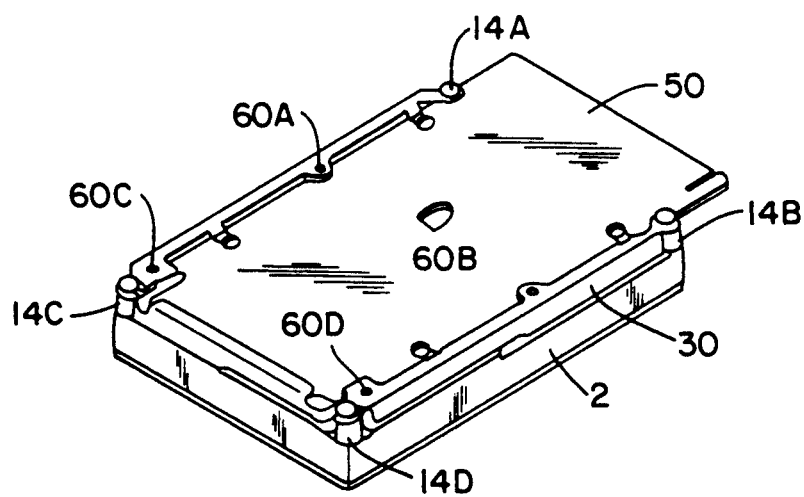
FIG. 8 is a perspective view showing the frame after the circuit board is mounted.

However, if the above condition is left as it is, there is a possibility that the hooks 38A, 38B, 38C, and 38D of the frame 30 may be detached from the grooves 20A, 20B, 20C, and 20D of the shock absorbing members 14A, 14B, 14C, and 14D. Therefore, as shown in FIGS. 7 and 8, a control circuit board 50 is fixed to the frame 30 by screws. That is, thread portions of bolts 56A, 56B, 56C, and 56D are inserted into mounting holes 52A, 52B, 52C, and 52D in the control circuit board 50 respectively, and the thread portions protruding from the mounting holes are screwed into mounting holes 54A, 54B, 54C, and 54D of the frame 30 respectively to fix the control circuit board 50 to the frame 30. This prevents the frame 30, specially the first frame section 34 and the second frame section 36 from being elastically deformed and also the hooks 38A, 38B, 38C, and 38D of the frame 30 from being detached from the grooves 20A, 20B, 20C, and 20D of the shock absorbing members 14A, 14B, 14C, and 14D respectively.

Then the base 2 is mounted on an external apparatus using mounting holes 60A, 60B, 60C, and 60D of the frame 30.

As described above, the embodiment has the advantages that no nut is necessary to fix the frame 30 to the shock absorbing members 14A, 14B, 14C, and 14D, and that it is easily manufactured at a low cost. Also, an adequate shock absorbing effect can be obtained because only the grooves of the shock absorbing member need stiffness.

Figure 9:
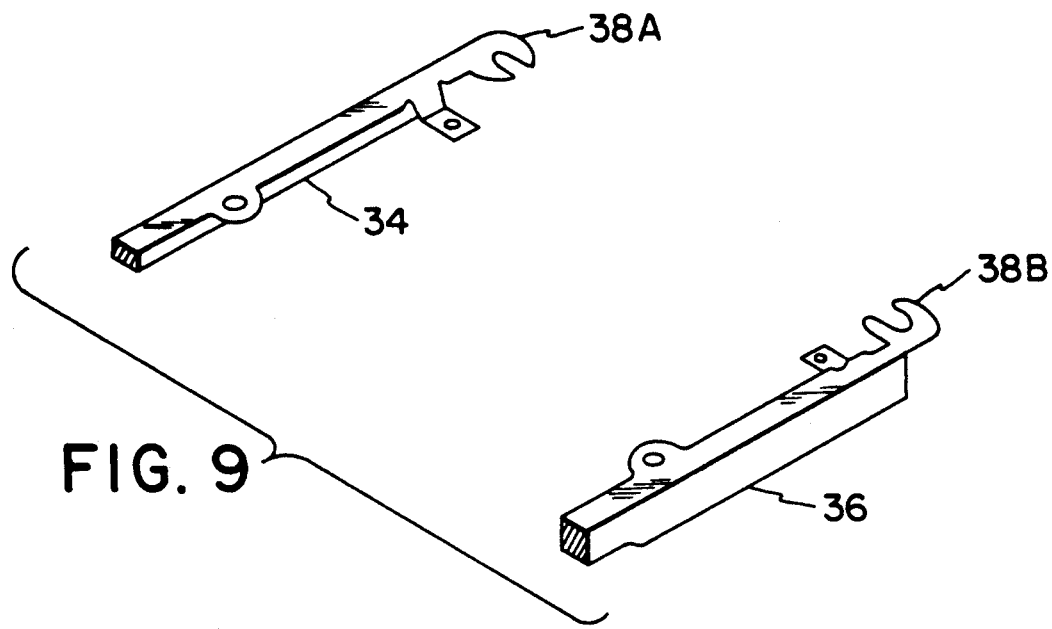
FIGS. 9 and 10 are partial perspective views showing other examples of frame hook construction.
Figure 10:
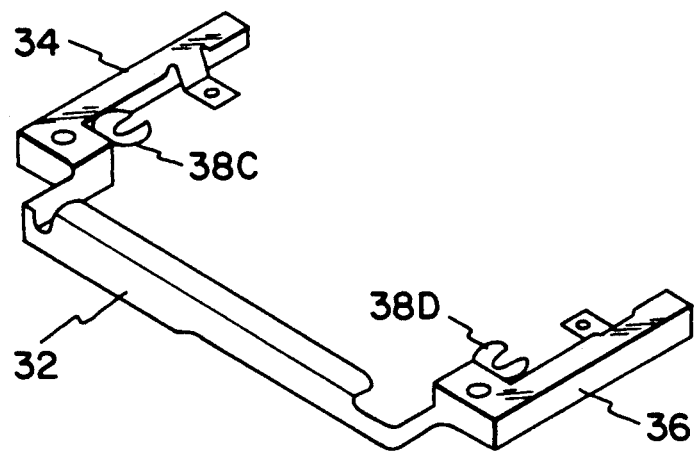
Figure 11:
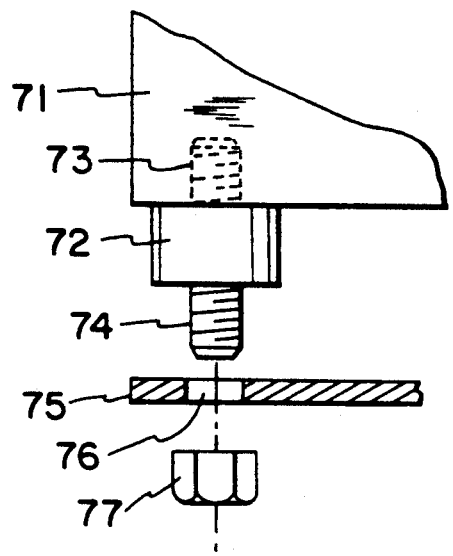
FIGS. 11, 12, and 13 are partial front views showing vibration isolating structures of a magnetic disk apparatus according to prior art.
Figure 12:
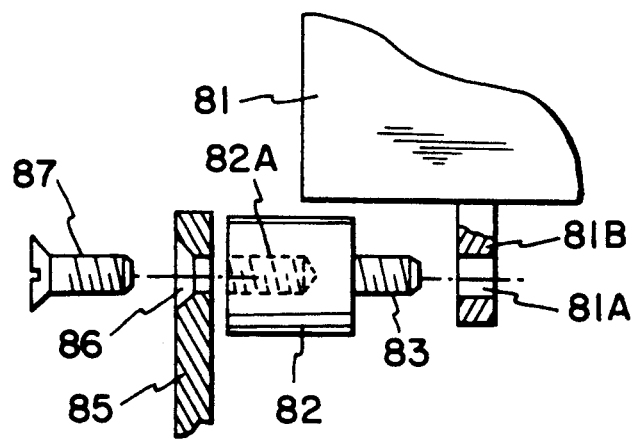
Figure 13:
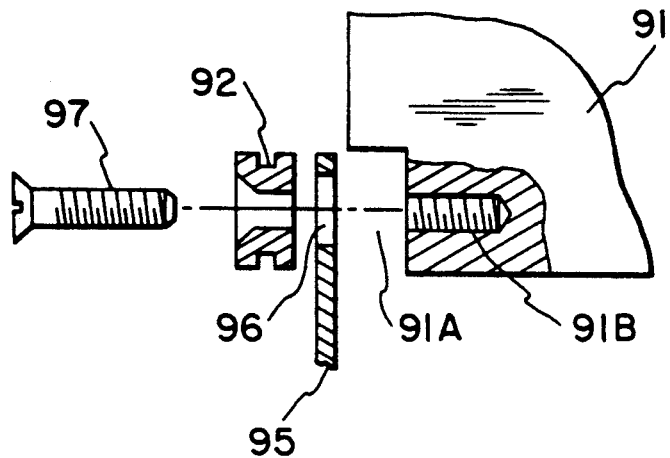
Figure 14:
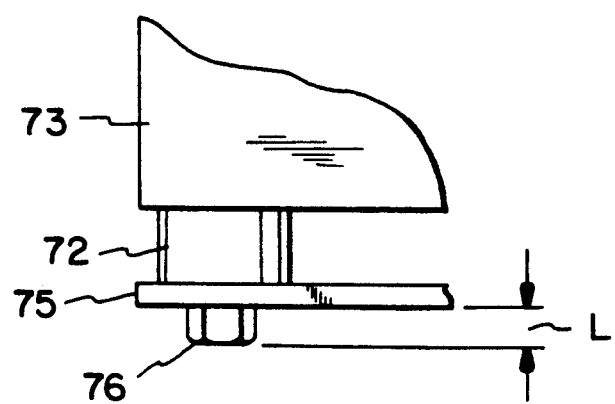
FIG. 14 is a partial elevation view of the structure of FIG. 11.

In the above embodiment, the hooks 38A and 38B on the free ends of the first frame part 34 and second frame part 36 are designed so that the groove engaging faces 40A and 40B are oriented outward, at is, they are back-to-back. However, it is also possible to design the hooks so that the groove engaging faces 40A and 40B are oriented inward, that is, they are face-to-face as shown in FIG. 9. In this case, necessary to fit the hooks 38A and 38B into the grooves 20A and 20B of the shock absorbing members 14A and 14B by bending the free ends of the first frame part 34 and the second frame part 36 so that they will be brought to the outside of the shock absorbing members 14A and 14B respectively and then releasing them.

In the above embodiment, the first frame part 34 and the second frame part 36 are designed so that they are extended in parallel. However, it is not always necessary to design them in parallel. It is only necessary that the distance between the free ends of the first and second frame parts is made equal to the distance between two shock absorbing members. Also, the number of frame parts is not limited to two such as the frame part 34 and frame part 36. One or three or more frame parts are allowed. In any case, it is only necessary to have an elastic frame part with one free end. It is not necessary to provide the hook on the free end of the frame part. It may be provided on the middle position of the frame part and it is unnecessary to give elasticity to the frame parts other than at least one of the frame parts provided with a hook. It is further not necessary to use rolled plate for the frame. Any elastic material (e.g., copper) can be used. In general all types of sheet metals manufactured by rolling have elasticity, and can be used for the frame. Also, the shock absorbing member is not limited to rubber. Any elastic material with a vibration damping function can be used for the shock absorbing member.

The magnetic disk driving motor and the magnetic head positioning system are not always mounted on the base. It is only necessary for at least one of them to be mounted on the base.

This invention can be applied not only to a magnetic disk apparatus, but to any other apparatus which should be protected from external vibration and impact.

As described above, in accordance with this invention, a hook is provided on an elastic frame, the hook is fitted into a groove of a shock absorbing member, and a board-like member is mounted on the frame. Therefore, this invention has the advantages that no nut is necessary to fix the frame on the shock absorbing member that the product is easily manufactured at a low cost, that adequate shock absorbing effect is obtained because only the groove of the shock absorbing member needs stiffness, and that there are few limitations with respect to the position of the frame.

What is claimed is:

1. A shock-mounting structure comprising:
   a shock absorbing member at least partially consisting of an elastic material with a vibration damping function, having a groove at the side, and being fixed to a vibration-isolated object;
   a frame including an elastic frame part, one end which is fixed, and the other end of which is free;
   a hook provided on said frame part so that said hook can be fitted into said groove of said shock absorbing member; and
   a fixing member mounted to said frame part to fix said frame to said shock absorbing member with said hook being fitted into said grooves of said shock absorbing member.

2. A shock-mounting structure comprising:
   first and second shock absorbing members each of which at least partially consists of an elastic material with a vibration damping function, which has a groove at the side, and which is separately fixed to a vibration-isolated object;
   a frame including a first elastic frame part one end of which is fixed and the other end of which is free, and a second elastic frame part oen end of which is fixed and the other end of which is free and separated from the other end of said first frame by a distance equal to that between said first and second shock absorbing members;
   first and second hooks provided on said first and second frame parst respectively so that said first and second hooks can be fitted into said grooves of said first and second shock absorbing members; and
   a board-like member mounted to said first frame part and to said second frame part to fix said frame to said shock absorbing member with said first and second hooks being fitted respectively into said grooves of said first and second shock absorbing members.

3. A shock-mounting structure as defined in claim 2 wherein groove engaging faces of said first and second hooks which may engage with the bottoms of said groove of said first and second shock absorbing members are oriented oppositely.

4. A shock-mounting structure comprising:
   first and second shock absorbing members each of which at least partially consists of an elastic material with a vibration damping function, which has a groove at the side, and which is separately fixed to a vibration-isolated object;
   a frame including a first elastic frame part one end of which is fixed and the other end of which is free, and a second elastic frame part one end of which is fixed and the other end of which is free and separated from the other end of said first frame by a distance equal to that between said first and second shock absorbing members;

first and second hooks provided on said first and second frame parts respectively so that said first and second hooks can be fitted into said grooves of said first and second shock absorbing members;

a board-like member mounted on said first and second frame parts to fix said frame to said shock absorbing member with said first and second hooks being fitted respectively into said grooves of said first and second shock absorbing members;

a third shock absorbing member at least partially consisting of an elastic material with a vibration damping function, having a groove at the side, and being fixed to said vibration-isolated object with said third shock absorbing member being separated from said first shock absorbing member by the distance equal to the length of said first frame part;

a fourth shock absorbing member at least partially consisting of an elastic material with a vibration damping function, having a groove at the side, and being fixed to said vibration-isolated object with said fourth shock absorbing member being separated from said second shock absorbing member by the distance equal to the length of said second frame part; and third and fourth hooks provided on one ends of said first and second frame parts respectively so that said third and fourth hooks can be fitted into said groove of said third and fourth shock absorbing members.

5. A shock-mounting structure comprising:

a frame including an elastic frame part;

a vibration-isolated object;

a plurality of shock absorbing members, each with a groove at the side, mounted on one of said frame and said vibration-isolated object;

a like plurality of generally U-shaped hook portions carried by the other of said frame and said vibration-isolated object and aligned with said shock absorbing members with the hook portions respectively received by the grooves of the aligned shock absorbing member;

at least one of said shock absorbing member and co-operating hook combinations interconnecting said elastic frame part to said vibration-isolated object; and a circuit board mounted on said frame to fix said frame with respect to said shock absorbing members with said hooks respectively fitted into the grooves of said shock absorbing members.

* * * * *